United States Patent Office 3,592,790
Patented July 13, 1971

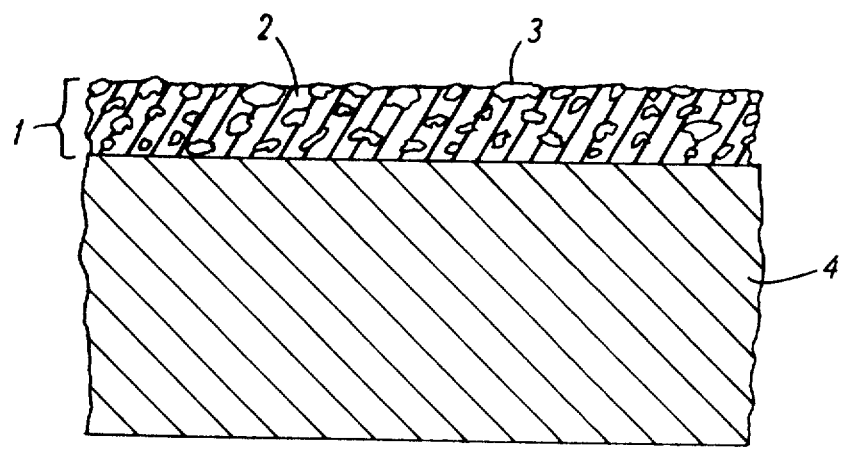

3,592,790
COATING COMPOSITION AND METHOD OF COATING ARTICLES THEREWITH
Lloyd T. Flanner, Florham Park, and Paul D. Dernier, Stirling, N.J., assignors to Allied Chemical Corporation, New York, N.Y.
Filed June 27, 1968, Ser. No. 740,764
Int. Cl. C08f 37/18; C08g 51/24
U.S. Cl. 260—33.6                                17 Claims

ABSTRACT OF THE DISCLOSURE

Disclosed are aerosol spray compositions suitable for home application of non-stick coatings to food processing utensils, comprising finely divided granular polytetrafluoroethylene, methylphenyl silicon resin binder, and a solvent-propellant carrier mix, and a method of coating food processing utensils with these compositions, which method comprises the steps of first spray coating the utenils with these compositions, and then baking the spray coat to form a hard abrasion resistant non-stick surface.

---

Food processing utensils, particularly cooking vessels, having food contacting surfaces coated with a non-stick plastic material have found wide acceptance in domestic as well as commercial use. Foods cooked in such vessels will release therefrom without the necessity for using grease as a release agent, and such vessels are easily cleaned.

Commercially applied non-stick coatings commonly comprine either perhalogenated hydrocarbon polymers, or compositions comprising perhalogenated hydrocarbon polymers and resinous binders. Polytetrafluoroethylene, hereinafter referred to as PTFE, is known to produce superior non-stick coatings on account of its excellent thermal stability and slippery surface.

A variety of resinous binders have been proposed for use in such coatings, notably the condensation polymers of epichlorohydrin and bisphenol, phenolic resins, furan resins, halogenated vinyl resins, urea-formaldehyde resins, silicone resins, and mixtures thereof. Silicon resins are particularly suited because they have relatively good thermal stability, and they have non-stick properties of their own. The use of a binder resin aids in overcoming the major obstacle encountered in the production of non-stick plastic coated utensils, viz the difficulty of obtaining a good bond between coating and substrate.

Methods commonly used for the application of non-stick plastic coatings to food processing utensils include the steps of coating the surface to be treated by dipping, spraying, brushing, or electrophoretic deposition with an amulsion or suspension of the plastic material in a suitable liquid vehicle, removing the vehicle by evaporation, and thereafter baking the coating so applied to form a uniform layer of a hard non-stick coating. Prior to the coating operation the surfaces to be coated may be subjected to various treatments to enhance their receptivity for the coating, which treatments include surface roughing, acid and solvent rinses, and the interposition of an intermediate layer, sometimes of a porous nature, between the metal substrate and non-stick coating.

Presently known coating processes present great technical difficulties and must be conducted under closely controlled conditions. Of all the coatings in common use those comprising PTFE are the most difficult to apply because the non-stick properties of PTFE make for poor adhesion, unless special precautions are taken. For these reasons there is not currently available for home application a non-stick coating composition comprising PTFE. Availability of a coating composition for food processing utensils, suitable for home use, and comprising PTFE, would be desirable because it would allow the housewife to give non-stick properties to uncoated food processing utensils, to recoat those utensils from which the coating has worn off, and to repair scratched coatings.

Accordingly it is an object of this invention to provide aerosol compositions for coating food processing utensils to give said utensils heat stable non-stick surfaces.

It is another object of this invention to provide aerosol compositions for coating food processing utensils with heat stable non-stick coatings, suitable for home application.

Yet another object of this invention is the provision of aerosol compositions for coating food processing utensils with a heat stable non-stick coating comprising PTFE in a form which is easy to store and easy to handle.

A further object of this invention is the provision of a method for coating food processing utensils to give said utensils heat stable non-stick surfaces.

In accordance with the present invention there are provided aerosol coating compositions, suitable for home application, critically comprised of approximately equal proportions by weight of finely divided granular PTFE, having a critical means particle size below about 15$\mu$, as hereinbelow defined, and a heat curable methylphenyl silicone resin, as hereinbelow described, dispersed in a suitable solvent-propellant mix. Heat stable non-stick coatings on food processing utensils may be readily obtained therewith by first spray coating the utensils to form a coating comprising PTFE and uncured silicon resin binder, hereinafter referred to as initial coating, and then baking the initial coating to cure the organic silicon binder to form a tough continuous heat stable non-stick coating. In the following description the finished baked coating is referred to as baked coating.

The present invention is further illustrated by the accompanying drawing, which shows a simplified greatly enlarged fractional cross-sectional view of a coating produced in accordance with the present invention.

Referring now to the drawing in more detail, the baked coating obtained by using the compositions of this application is a continuous film 1 of cured methylphenyl silicone resin binder 2 having embedded therein individual granules 3 of finely divided granular PTFE. Film 1 is formed on substrate 4, here shown as a metal substrate. As the utensil is used, the resin binder is preferentially worn down and the individual PTFE granules closest to the surface are exposed. The non-stick properties of the objects coated with the compositions of this invention are principally derived from the exposed PTFE granules.

In the following description of the compositions of our invention, that portion of the compositions comprising finely divided granular PTFE and uncured methylphenyl silicone resin binder shall be referred to as the solid component, and the remaining portion comprising the solvent-propellant mix shall be referred to as the carrier.

In the compositions of our invention three things are critical in order to obtain stable compositions giving non-stick coatings having optimum non-stick properties combined with good adhesion, surface hardness, and resistance to scratching, and having no deleterious effect on the food to be prepared in contact therewith: (1) the particle size of the finely divided granular PTFE, (2) the selection of the methylphenyl silicone binder resin, and (3) the ratio of the finely divided granular PTFE to the methylphenyl silicone resin binder.

Granular PTFE powders suitable for use in the compositions herein disclosed must have a mean particle size below about 15μ, and may not contain more than about 0.1 percent by weight of particles larger than about 15μ. Preferred granular PTFE powders are those having a mean particle size of between about 5μ and about 10μ and a narrow particle size distribution, preferably not containing more than about 2½ percent by weight of particles having a particle size larger than about 10μ. The PTFE powder should not contain particles having a particle size larger than about 50μ, because particles of that size tend to cause clogging of the nozzle of the aerosol spray container from which the compositions of this invention are to be dispensed.

The particle size, as herein used, is the particle size determined by use of the "Coulter Counter" (T.M.). The "Coulter Counter" (T.M.) provides a method for the determination of particle size in the 1 to 100μ range, which is based on the principle of changes in the electrical conductance of an electrolyte solution, containing suspended therein the particles the size of which is to be determined, as the solution and suspended particles pass through a small orifice. "Coulter Counters" (T.M.) are commercially available instruments.

Finely divided granular PTFE powders suitable for use in the non-stick coating compositions of our invention are the mechanically subdivided products of the polymerization of the gaseous tetrafluoroethylene monomer under pressure in an aqueous solution containing a catalyst, as e.g. described in U.S. Pat. 2,393,967 to Brubaker. Such granular PTFE polymer is obtained as a powder comprised of particles of rough and irregular shape having a total surface area of from 1 to 4 square meters per gram as measured by nitrogen absorption. This total surface area, on the assumption that all particles are spherical, corresponds to a calculated ultimate average particle size of 0.67 to 2.67μ. The so-called paste PTFE obtained by coagulation of an aqueous colloidal suspension of the polymer in which the ultimate particle size is in the order of 0.1μ, and colloidal suspensions of PTFE, are not suitable for use in the compositions of this invention. Suspensions of colloidal size PTFE are stable only in the presence of wetting and dispersing agents, and in such suspensions the PTFE tends to coagulate upon agitation or shaking. Once coagulated, colloidal size PTFE is not readily re-dispersed. Moreover, in the compositions of this invention the use of wetting or dispersing agents is highly undesirable because their presence in non-stick coatings adversely affects the taste of food prepared in contact therewith. Our compositions do not require the use of such agents. In our compositions the PTFE particles will settle out, but are readily re-dispersed, as by shaking of the container before use.

Methylphenyl silicone resins convertible by heat to the solid, cured state suitable for use in the coating compositions of the present invention are partially condensed multifunctional methylphenyl silanols, soluble in organic solvents, as, e.g., described in U.S. Pat. 2,258,222 to Rochow.

Preferred are those partially condensed multifunctional methylphenyl silanols in which the total number of methyl plus phenyl radicals per silicon atom is between from about 1 to not more than about 1.5, and the ratio of methyl radicals to phenyl radicals is greater than about 1. Optimum results are obtained with those partially conednsed multifunctional methylphenyl silanols in which the total number of methyl plus phenyl radicals per silicon atom is between from about 1.2 to about 1.5, and the ratio of methyl radicals to phenyl radicals is between from about 1.2 to about 1.4.

These heat curable methylphenyl silicone resins are preferably employed in the form of solutions in mixed aromatic and aliphatic hydrocarbon solvents having a kauri-butanol value, as hereinbelow defined, between about 30 and 100, preferably between about 40 and 80. These solutions may contain between about 15 percent to about 25 percent by weight, preferably about 18 to 22 percent by weight, of the heat curable methylphenyl silicone resin.

While these heat curable methylphenyl silicone resins can be cured without use of a curing catalyst, the use of curing catalyst allows shorter curing times, and for that reason is preferred. Exemplary suitable curing catalysts are the organic salts of such metals as tin, zinc, iron, or lead. Preferred curing catalysts are iron octoate and zinc naphthenate. The curing catalyst, if one is used, is preferably employed in an amount of between about 0.2 to about 0.1 percent, more preferably about 0.05 to about 0.07 percent by weight, based on the weight of the metal and the resin.

The release characteristics of the heat curable methylphenyl silicone resins suitable for use in the coating compositions of the present invention may optionally be improved by admixture of small amounts of difunctional silicone fluids, such as dimethyl silicone fluids.

Solutions of heat curable methylphenyl silicones suitable for use in the practice of the present invention are commercially available. A particularly suitable methylphenyl silicone binder composition, in form of a solution having a solid content of about 20 percent by weight, is available from General Electric Co. under the designation G.E. SR–417.

As stated hereinabove, in our coating compositions the ratio of the PTFE granular powder to the methylphenyl silicone binder resin is critical. Best results are obtained when the PTFE granular powder and the methylphenyl silicone binder resin are employed in about equal amounts by weight. The use of a substantial excess of either will result in coatings having unsatisfactory properties. Useful ratios of PTFE granular resin to methylphenyl silicone binder resin, on a dry weight basis, range between about 0.5 to 1 and 1.5 to 1, with the preferred ratio ranging between about 0.65 to 1 and 1.35 to 1, and optimum ratios ranging between about 0.8 to 1 and 1.2 to 1. Compositions containing less than about 0.5 part by weight of PTFE granular resin per part of methylphenyl silicone binder resin yield coatings having insufficient non-stick properties as well as poor surface hardness, and compositions containing more than about 1.5 parts of PTFE granular resin per part of methylphenyl silicone binder resin yield coatings of poor adhesion and poor surface hardness.

In the compositions of this invention the solid component, as defined hereinabove, is dispersed in a carrier comprising a suitable solvent-aerosol propellant mix. The solvent portion of the carrier should be a solvent for the uncured methylphenyl silicone binder resin, and should have a volatility low enough to allow formation of a continuous liquid film upon spray application of the coating composition to give a continuous initial coat of substantially uniform thickness, but should be volatile enough to completely evaporate from the initial coat during the baking step. Compositions containing highly volatile solvents, such as acetone or ether, yield dry sprays having insufficient flow-out characteristics. Using the atmospheric pressure boiling point as a measure of volatility, it is preferred to employ solvents having a boiling point above about 150° F. Suitable solvents include hydrocarbons and halogenated hydrocarbons, both aromatic and aliphatic, as well as organic ethers, alcohols, ketones, and esters.

Solvents suitable for use in the compositions of this invention are those having a kauri-butanol value between about 30 and 100. The kauri-butanol value is a measure of the solvent power of petroleum thinners used in paints and varnishes, and is the number of milliliters of the thinner required to cause cloudiness when added to 20 grams of a solution of kauri gum in butyl alcohol. The solution is prepared in the proportion of 100 grams of kauri in 500 grams of butyl alcohol. Since after spray application the initial coat must be baked at temperatures in excess of about 350° F., it is preferred, for the purpose of precluding the possibility of fire and explosion, to employ non-flammable solvents. Exemplary suitable solvents are hydrocarbons such as odorless naphtha, mineral spirits and aromatic naphtha, halogenated hydrocarbons such as trichloroethylene, methyl chloroform, perchloroethylene and difluorotetrachloroethane, solvents containing functional groups such as cyclohexanone, cyclohexyl ether, cyclohexanol, acetonyl acetone, glycol methyl ethers, isophorone, n-methyl-pyrrolidone, butyl lactate, 2-butoxy) ethyl acetate and others. A preferred solvent is 1,1,1-trichloroethane, which is nonflammable, has a boiling point of 75° C., and a kauri-butanol value of 106. It is to be understood, however, that single solvents, as well as mixtures containing two or more of different solvents may be employed as the solvent portion of the carrier of the compositions of this invention.

Suitable propellants for use in the aerosol compositions of this invention are the well known saturated hydrocarbons and halogenated hydrocarbons commonly employed in the formulation of aerosol mixtures, and include, for example, hydrocarbons such as methane, ethane, propane, isobutane, as well as halogenated hydrocarbons such as d i c h l orodifluoromethane, monochlorotrifluoromethane, monobromotrifluoromethane, carbon tetrafluoride, dichloromonofluoromethane, monochlorodifluoromethane, trifluoromethane, monochloromonofluoromethane, methylene fluoride, methyl chloride, methyl fluoride, sym.-dichlorotetrafluoroethane, 1,1 - dichlorotetrafluoroethane, monochloropentafluoroethane, hexafluoroethane, 1,1,1,2-tetrafluoromonochloroethane, 1,1,2,2 - tetrafluoromonochloroethane, pentafluoroethane, 1,1-difluoro-1-chloroethane, 1,1,1-trifluoroethane, 1,1-difluoroethane, and octafluoropropane, and mixtures of two or more of the aforementioned propellants. In general, any volatile organic material that exists as a gas at room temperature, and exists mainly as a liquid at room temperature and elevated pressure may be used as propellant. Those having a vapor pressure within the range of about 10 to 85 p.s.i.g. at 70° F. are preferred propellants. For reasons of safety, however, it is preferred to employ nonflammable propellants, i.e. those highly halogenated.

The ratio of solvent to propellant in the carrier portion of the compositions of this invention may vary widely, provided the carrier contains an amount of propellant sufficient to substantially completely discharge the composition from the aerosol container under constant maintenance of a suitable spray pattern. Since the propellants are generally more expensive than the solvents useful in the compositions of this invention, it is preferred, for reasons of economy, to use the minimum amount of propellant, and the maximum amount of solvent. Use of a minimum amount of propellant is further favored for the reason that a deficiency of solvent will result in dry sprays having insufficient flow-out characteristics, hence uneven initial coats of excessive surface roughness. Suitable propellant-solvent ratios, on a weight basis, range between about 1:0.5 and about 1:2, preferred ratios ranging between about 1:0.7 and about 1:1.5. In practical application it was found that good results are obtained when solvent and propellant are used in about equal amounts by weight, say in a propellant: solvent weight ratio between about 1:0.8 and about 1:1.1.

The coating compositions of this invention may contain from about 1 percent to about 6 percent by weight of the solid component, the balance being the carrier. Preferred proportions of the solid component range between about 2.0 percent and about 3.0 percent by weight. Compositions containing less than about 1 percent by weight of the solid component tend to give insufficient coverage in a one coat application, and compositions containing more than about 6 percent by weight of the solid component tend to give coatings of uneven coverage and high surface roughness.

The compositions of this invention are prepared by simply mixing the ingredients, and are filled into aerosol containers of conventional construction by methods known to those skilled in the art.

The non-stick coating compositions of this invention may be applied to the surface of any solid material having sufficient heat stability to withstand the temperatures required for heat curing the methylphenyl silicone binder resin. Coatings may be applied, with good adhesion, to metals, as for example cast iron, steel, stainless steel, aluminum and copper, as well as to vitreous surfaces, as for example glass, poreclain, "Pyroceram" (T.M.), china, and earthenware.

To insure good adhesion of the coating, the surfaces to be coated must first be thoroughly cleaned to remove all grease, dirt, and loose particles. Cleaning is conventional, and may, for example, be accomplished by washing with detergents, scouring, rinsing with solvents, or treatment with acids or alkalies. After cleaning, the surfaces to be coated are allowed to dry.

Application of the coating following the cleaning operation involves a simple two step procedure. first spray coating the composition onto the surfaces to be coated to form the initial coat, then baking the initial coat to cure the methylphenyl silicone resin binder.

The initial coat is applied by evenly spraying the composition of this invention from an aerosol spray container onto surfaces cleaned as described above, holding the discharge valve of the aerosol spray container at a suitable distance from the surface, as about 6 to 8 inches. The composition is applied in the manner of an aerosol spray paint, in an amount sufficient to produce a wet coat of even thickness completely covering the surface. Application of an excess of the composition should be avoided since it tends to cause "runs," hence results in coatings of uneven thickness.

The initial coat is then allowed to dry at least partially at room temperature, and the object so coated is then baked to cure the methylphenyl silicone resin binder. Curing times and temperatures are interrelated, and depend on such factors as the degree of condensation of the multifunctional methylphenyl silanols comprising the methylphenyl silicone binder portion of the solid component, and the type and amount of curing catalyst employed. Lower curing temperatures require longer curing times, and conversely, employment of higher curing temperatures shortens the required curing time. When G.E. SR–417 is used as the binder resin, suitable curing temperatures range between about 350° F. and about 500° F. Optimum curing times range between about 6 hours when a curing temperature of about 350° F. is employed, and about 2 hours when the curing temperature is about 500° F. A curing time of about 3 hours is required for a curing temperature of about 425° F. Should the utensil to be coated be equipped with plastic parts, such as plastic handles, it is advisable to remove these parts prior to the baking operation; otherwise they may be charred.

Upon completion of the baking step the utensil is removed from the oven and is allowed to cool. Prior to its first use only it is advisable to apply a light coat of grease, as salad oil, butter, margarine, shortening, or lard to the coated surface. The reason for grease application in first use is that in the baked coating, as produced, the PTFE particles are substantially completely covered by methylphenyl silicone binder resin. During first use the top surface of the baked coating is slightly worn down, and the PTFE particles closest to the surface become exposed. Since the non-stick properties of the coatings produced in accordance with the present invention are principally derived from the exposed PTFE particles, optimum non-stick properties are not developed until after first use. After first use it is not necessary to grease the utensils coated with the compositions of this invention.

The thickness of the fully cured coating applied as described hereinabove will range between about 0.4 and about 1.0 mil. Coatings having a thickness of between about 0.4 and about 1.3 mils have given satisfactory performance. Thicker coatings may be obtained by either applying two or more initial coats without intervening baking step, or by repeating the coating and baking steps serially until a coating of the desired thickness is obtained. The latter method yields coatings of greater hardness and, for that reason, is the preferred method when coatings of greater thickness than obtainable by single coat application are desired. While the coatings obtained by the single coat procedure have good durability, thicker coatings as obtainable by multiple coat procedure have better durability yet and, for that reason, may be preferred when the coated utensil is subjected to hard use.

It has also been found that the coating compositions of this invention are eminently suitable for repairing scratches in non-stick surfaces exposing the substrate. Such repairs are readily accomplished by first thoroughly cleaning the substrate showing through the scratched coating, and then applying a non-stick coat to the exposed area using the composition of this invention in the manner described hereinabove.

The following examples are given to further illustrate this invention.

EXAMPLE I

An aerosol spray composition for applying non-stick surface coatings to kitchen utensils was prepared as follows: 7 grams of silicone resin composition G.E. SR–417, having a 20 percent solids content, 1.4 grams of finely divided granular PTFE having an average particle size of $5\mu$ and containing not more than 2.5 percent by weight of particles having a particle size of between $10\mu$ and $15\mu$, and containing less than 0.1 percent by weight of particles larger than $15\mu$ obtained by airmilling to desired particle size in a "Jet-O-Mizer" fluid energy mill of "Halon G-50," a commercially available granular PTFE product having a mean particle size between about $300\mu$ and about $400\mu$, were dispersed in 46.6 grams of 1,1,1-trichloroethane. This liquid dispersion was filled into a ¼ pound tin-plate aerosol container having a soldered side seam and double seamed top and bottom of the type approved by the U.S. Department of Transporation for aerosol compositions having vapor pressures not exceeding 140 p.s.i.g. at 135° F., fitted with an aerosol valve having a one inch tin-plated conical cup and a flowed in gasket. The valve had a body opening of about 0.08 inch, an external valve orifice of 0.13 inch, and an external actuator terminal orifice opening of 0.16 inch. Forty-five grams of dichlorodifluoromethane were added to the mixture in the can under pressure through the discharge valve. The ingredients were mixed by shaking the aerosal container.

The following examples illustrate the application of a non-stick coating to utensils employing the coating composition of this invention.

EXAMPLE II

An ordinary household stainless steel fry pan of 10 in. diameter was thoroughly cleaned by scouring with a commercial scouring powder and water, and was allowed to dry. The inside of the pan was then rinsed once with tetrachlorodifluoroethane and again allowed to dry. The aerosol coating composition of Example I was applied to the inner surface of the pan in an even coat by spraying the surface from a distance of about six to eight inches. The coating was allowed to dry at room temperature for a period of ½ hour. The pan was then baked in a pre-heated oven for two hours at 500° F. to cure the binder portion of the coating composition. After cooling to room temperature a light coat of salad oil was applied to the coated surface by wiping the surface with a paper towel which had been dipped lightly in salad oil.

In the fry pan so treated were cooked, after one initial use, and without addition of grease, eggs, canned spaghetti with sauce, American cheese, bacon and grilled cheese sandwiches. None of these foods stuck to the pan, and the pan, after use, could be cleaned by simply wiping it with a paper towel. This is in sharp contrast to untreated pans, which require application of grease before each use.

EXAMPLE III

An aluminum ice cube tray having aluminum partitions was coated by the process of Example II using the composition of Example I. The tray so coated and an identical uncoated tray were filled with water, and the water was frozen by storing the trays in a household freezer. After freezing the ice cubes were removed from the trays immediately after removal from the freezer. Removal of the ice cubes from the untreated tray required considerable effort, resulting in breakage of some of the cubes and some of the ice remained stuck to the tray. Removal of the ice cubes from the treated tray, on the other hand, required little effort, because the ice did not adhere to the tray, and the ice cubes did not break.

EXAMPLE IV

One half of the inside of a "Pyrex" (T.M.) dish was coated in the manner described in Example II with the composition of Example I. The other half of the inside of the dish was left uncoated. A cheese and spaghetti casserols was baked in the dish so treated without initial application of grease, and allowed to cool to room temperature. Upon removal of the food from the dish severe adhesin of the food was found on the untreated side, whereas none of the food adhered to the coated side of the dish.

In the following tests surface hardness, surface roughness, and coefficient of friction were determined as follows:

Surface hardness was determined on non-stick coated steel panels using a Taber abraser following the ASTM D 1044–56 test method, except that a calibrase #17 hardness wheel was used, and that abrasion was continued until exposure of a continuous portion of the steel panel was noted. Surface hardness is expressed as the number of cycles required to so expose a continuous portion of the steel panel.

Surface roughness was determined on non-stick coated steel panels using a Brush Surface Analyzer. In that test a diamond stylus connected to a piezo electric crystal is mechanically moved over the surface and roughness of which is to be determined. Displacement of the diamond stylus caused by surface roughness is translated into electrical impulses, the voltage of which is directly proportional to the displacement of the stylus. Results are presented numerically as root mean square micro inches.

Coefficient of friction was determined on non-stick coated steel test, panels following ASTM test procedure 1894–63.

To determine the effect of the silicone binder-PTFE ratio on the surface hardness of the coatings produced with the compositions of this invention, a series of compositions containing silicone binder and PTFE in various proportions were prepared in the manner described in Example I. Total solids content, PTFE and methylphenyl silicone binder resin, of these compositions was 2.8 percent by weight. These compositions were coated onto clean cold rolled steel panels having an electrolytic tin plate in the manner described in Example II. The surface hardness of these coatings was determined as described above. Test results are listed in the following Table 1:

TABLE 1

| Run | Ratio silicone binder:PTFE | Surface hardness, cycles | Remarks |
| --- | --- | --- | --- |
| 1 | 1:0.35 | 410 | Unacceptable. |
| 2 | 1:0.8 | 580 | Good coating. |
| 3 | 1:1 | 600 | Very good coating. |
| 4 | 1:1.2 | 540 | Acceptable coating. |
| 5 | 1:1.65 | 430 | Unacceptable. |

Coatings having a surface hardness of at least about 500 are acceptable for normal use, those having a surface hardness in excess of about 550 being preferred. Coatings having a surface hardness of less than about 500 are too soft for normal use, and are unacceptatble.

To determine the influence of the particle size of the granular PTFE powder on surface roughness and coefficient of friction of the non-stick coatings produced with the compositions of this invention, a number of steel test panels were coated by the method of Example II using a coating composition containing the same ingredients in the same proportions as in Example I, but containing PTFE granular powders of various mean particle sizes. Surface roughness and coefficient of friction were determined as described above. Test results are shown in Table 2 below.

TABLE II

| Mean particle size of the PTFE granular powder, $\mu$ | Surface roughness, microinches | Coefficient of friction |
|---|---|---|
| 30 | 110–140 | .78 |
| 25 | 100–130 | .74 |
| 20 | 85–100 | .71 |
| 15 | 62–74 | .53 |
| 5 | 40–50 | .39 |

The lower the surface roughness, and the lower the co-efficient of friction, the betetr the non-stick properties of the coatings produced in accordance with the present invention. We have found that coatings having a surface roughness of less than about 60 microinch, and a co-efficient of friction of less than about 0.50 have satisfactory non-stick properties, and that coatings having a surface roughness in excess of about 60 microinch, and a co-efficient of friction in excess of about 0.50 are not acceptable.

This invention may be embodied in other forms, or carried out in other ways, without departing from the spirit or essential characteristics thereof. The present embodiment is, therefore, to be considered in all respects as illustrative and not restrictive, the scope of the invention being limited only by the appended claims.

We claim:
1. An aerosol composition comprising
    (1) between about 1 percent and 6 percent by weight of a mixture comprising
        (a) finely divided granular polytetrafluoroethylene having a total surface area of from 1 to 4 square meters per gram as measured by nitrogen absorption, and having a mean particle size below about $15\mu$, and
        (b) a methylphenyl silicone resin convertible by heat to the cured solid state,
        in a weight ratio of granular polytetrafluoroethylene to methylphenyl silicone resin of between about 0.5 to 1 and about 1.5 to 1, and
    (2) between about 99 percent and about 94 percent by weight of a solvent-propellant mix comprising
        (a) a volatile organic solvent and
        (b) an aerosol propellant,
        in a ratio effective for aerosol spray application of the composition.

2. An aerosol composition according to claim 1, wherein the volatile organic solvent and the aerosol propellant are employed in a propellant:solvent weight ratio between about 1:0.5 and 1:2.

3. An aerosol composition according to claim 2, wherein the finely divided granular polytetrafluoroethylene has a mean particle size between about $5\mu$ and about $10\mu$, contains less than about 2.5 percent by weight of particles having a particle size of more than about $10\mu$, and contains less than about 0.1 percent by weight of particles having a particle size of more than about $15\mu$.

4. An aerosol composition according to claim 2, wherein the methylphenyl silicone resin is a partially condensed multifunctional methylphenyl silanol, soluble in organic solvents, in which the sum of methyl and phenyl radicals per silicon atom is between from about 1 to about 1.5, and in which the ratio of methyl radicals to phenyl radicals is greater than about 1.

5. An aerosol composition according to claim 2 wherein the volatile organic solvent is a halogenated hydrocarbon solvent having an atmospheric pressure boiling point above about 150° F. and having a kauri-butanol value of between about 30 and about 100.

6. An aerosol composition according to claim 2 wherein the aerosol propellant is a halogenated hydrocarbon having a vapor pressure of between about 10 to 85 pounds per square inch at 70° F.

7. An aerosol composition according to claim 2 comprising as curing catalyst an effective amount of an organic salt of a metal selected from the group consisting of tin, zinc, iron and lead.

8. An aerosol composition according to claim 3 wherein the ratio of granular polytetrafluoroethylene to methylphenyl silicone resin is between about 0.65 to 1 and about 1.35 to 1.

9. An aerosol composition according to claim 8 wherein the methylphenyl silicone resin is a partially condensed multifunctional methylphenyl silanol, soluble in organic solvents, in which the sum of methyl and phenyl radicals per silicon atom is between from about 1 to about 1.5, and in which the ratio of methyl radicals to phenyl radicals is greater than about 1.

10. An aerosol composition according to claim 1 comprising
    (1) between about 2 percent and about 3 percent by weight of a mixture comprising
        (a) finely divided granular polytetrafluoroethylene having a mean particle size between about $5\mu$ and about $10\mu$, containing less than about 2.5 percent by weight of particles having a particle size of more than about $10\mu$, and containing less than about 0.1 percent by weight of particles having a particle size of more than about $15\mu$, and
        (b) a partially condensed multifunctional methylphenyl silanol, soluble in organic solvents, in which the sum of methyl and phenyl radicals per silicon atom is between about from 1.2 to 1.5, and the ratio of methyl radicals to phenyl radicals is between from about 1.2 to 1.4,
        in a ratio of granular polytetrafluoroethylene to partially condensed methylphenyl silanol of between about 0.8 to 1 and about 1:1.2, and
    (2) between about 98 percent and about 97 percent by weight of a mixture comprising
        (a) a halogenated hydrocarbon solvent having an atmospheric pressure boiling point above about 150° F., and having a kauri-butanol value of between 30 and about 100, and
        (b) a halogenated hydrocarbon aerosol propellant having a vapor pressure of between 10 to 85 pounds per square inch at 70° F.
        in a propellant:solvent weight ratio between about 1:0.7 and about 1:1.5.

11. An aerosol composition according to claim 10 wherein the halogenated hydrocarbon solvent is 1,1,1-trichloroethane.

12. An aerosol composition according to claim 10 wherein the halogenated hydrocarbon aerosol propellant is dichlorodifluoromethane.

13. An aerosol composition according to claim 10 comprising as curing catalyst an effective amount of an organic salt of a metal selected from the group consisting of tin, zinc, iron, and lead.

14. As a product, in combination, the aerosol composition according to claim 10 contained in an aerosol spray can.

15. A method of coating a surface with an aerosol composition according to claim 1, which comprises the steps of (1) applying an initial coat to said surface of a composition according to claim 1, (2) drying said initial coat, and then (3) curing the initial coat at a temperature of between about 350° F. to about 500° F.

16. A method according to claim 15 wherein the initial coat is applied from an aerosol dispenser.

17. A method according to claim 15 wherein steps 1 through 3 are serially repeated.

References Cited

UNITED STATES PATENTS

| 3,293,203 | 12/1966 | Paulus | 260—37 |
| 3,308,079 | 3/1967 | Haenni | 260—29.1 |

MORRIS LIEBMAN, Primary Examiner

R. ZAITLEN, Assistant Examiner

U.S. Cl. X.R.

260—29.1, 824, 900